United States Patent Office 2,758,005
Patented Aug. 7, 1956

2,758,005

PROCESS FOR REMOVING CARBONYL SULFIDE FROM GASES

Howard T. Oakley, Elizabeth, N. J., assignor to Esso Research and Engineering Company, a corporation of Delaware No Drawing. Application December 27, 1950, Serial No. 203,018

3 Claims. (Cl. 23—3)

This invention relates to the removal of carbonyl sulfide from hydrocarbon gases and more particularly relates to the extraction of carbonyl sulfide from these gases by means of an inorganic alkali at elevated temperatures.

One of the most difficult sulfur compounds to remove from petroleum refinery streams is carbonyl sulfide. This compound is partially removed from the gas by treating with caustic at ordinary temperatures (20–35° C.). However a large part of this compound remains unaffected by the caustic treatment with the result that the gas may not meet specification requirements for sulfur tolerance if sold as liquefied petroleum gas or it may contribute to odor if used in the manufacture of ethyl, isopropyl or butyl alcohols.

According to the present invention substantially all of the carbonyl sulfide can be removed from refinery gases containing it by contacting the gas with an aqueous inorganic alkali solution at temperatures between 70° and 150° C. Suitable alkali solutions include sodium hydroxide, potassium hydroxide and sodium sulfide. The strength of the alkali solution may vary between 1 and 10 weight percent.

The following example illustrates the critical effect of temperature in the amount of carbonyl sulfide removed:

| Reagent | Vapor Flow Rate, L./hr. | Tower Temperature, °C. | Percent Carbonyl Sulfide Absorbed |
|---|---|---|---|
| 7.4 wt. percent NaOH | 9.3 | 28 | 61 |
| 7.4 wt. percent NaOH | 9.3 | 80 | 91 |

From the above data it is evident that a fifty percent increase in carbonyl sulfide removal has been effected by increasing the operating temperature 52° C.

The nature of the present invention having been thus fully set forth and specific examples of the same given, what is claimed as new and useful and desired to be secured by Letters Patent is:

I claim:

1. Process for removing carbonyl sulfide from hydrocarbon gases which comprises contacting the gases with an aqueous alkali metal hydroxide solution at a temperature between 70 and 150° C.

2. Process according to claim 1 in which the alkali metal hydroxide solution is sodium hydroxide having a strength between 1 and 10 weight percent.

3. Process according to claim 2 in which the temperature of treatment is about 80° C.

References Cited in the file of this patent

UNITED STATES PATENTS

| 1,436,196 | Ramsburg | Nov. 21, 1922 |
| 1,609,872 | Garner | Dec. 7, 1926 |
| 2,146,353 | Rosebaugh | Feb. 7, 1939 |
| 2,362,669 | Schulze | Nov. 14, 1944 |
| 2,434,868 | Sample et al. | Jan. 20, 1948 |
| 2,477,314 | Scharmann | July 26, 1949 |
| 2,594,311 | Johnson | Apr. 29, 1952 |
| 2,662,000 | Maschwitz | Dec. 8, 1953 |

FOREIGN PATENTS

| 597,598 | Great Britain | Jan. 29, 1948 |
| 613,651 | Great Britain | Dec. 1, 1948 |

OTHER REFERENCES

Encyclopedia of Chemical Reactions, Jacobson, vol. II, page 354, Reinhold Publishing Corp., New York, N. Y., copyright 1948.

Perry: "Chemical Engineers Handbook," 3rd edition, page 1577, 1950; 2nd edition, 1941, page 2361, McGraw-Hill Book Co.